2,897,232
PHTHALIC ACID SEPARATION PROCESS

Joseph Paul O'Brien, Whiting, Ind., assignor to Standard Oil Company, Chicago, Ill., a corporation of Indiana No Drawing. Application June 13, 1957
Serial No. 665,609

4 Claims. (Cl. 260—525)

This invention relates to the separation of isophthalic acid and terephthalic acid from admixture.

The separation of a mixture of solid isophthalic acid and terephthalic acid is a very difficult problem by distillation or by crystallization from common solvents. Liquid dimethylformamide permits separation of these acids but even small amounts of water in the DMF greatly decrease the solubility of the acids therein. An object of the invention is a simple process for separating isophthalic acid from terephthalic acid using water and dimethylformamide. Other objects will become apparent in the course of the detailed description.

In the process of the invention a mixture of solid isophthalic and terephthalic acid which mixture has a mole ratio of isophthalic acid to terephthalic acid of less than about 8 is contacted with liquid dimethylformamide-water solution that is substantially saturated with a salt, inert to DMF or $H_2O$. Between about 2 and 15 volume percent of water is present. The liquid solvent is used in an amount not more than that needed to theoretically dissolve all of the isophthalic acid present in the mixture of acids, i.e., it is intended to form a solvent-acid solution which is saturated with respect to both acids. The solvent-acid solution is separated from the undissolved acids and the dissolved acids are recovered from the solution.

The solid acids which were not dissolved in the liquid dimethylformamide solvent vary in purity dependent upon the amount of solvent used. When the amount which is theoretically needed to dissolve all the isophthalic present in the mixture has been used the undissolved acids consist of very high purity terephthalic acid. As the amount of solvent is decreased more and more isophthalic acid is present in the undissolved material in the contacting zone. In all cases the acids present in the solvent-acid solution are a mixture of isophthalic acid and terephthalic acid in a mole ratio of 8 or higher, the extract mole ratio being dependent upon the temperature of contacting and recovery procedures.

The contacting of the liquid solvent and the acid mixture may be carried out at any temperature at which solvent is a liquid. It is preferred to carry out the contacting at temperatures in which large amounts of acids will be dissolved and yet not require higher pressures to keep the solvent liquid. It is preferred to carry out the contacting step at a temperature of about 100° C.

The acids are recovered preferably from the solvent-acid solution by cooling the solution to a temperature wherein acids are crystallized from the solution. It is preferred to carry out the contacting step at the elevated temperature of about 100° C. and then to cool the solution to about ambient temperature, i.e., between about 10° C. and 30° C. to crystallize acids from the solution. A saturated solution of solvent and acids is separated from the crystals of isophthalic acid and terephthalic acid and, preferably, is recycled to the initial contacting zone.

In addition to the dimethylformamide and water solution, which consists essentially of about 2 to 15 volume percent water and 98 to 85 volume percent dimethylformamide, the solvent contains a salt in an amount sufficient to saturate or substantially saturate the DMF-water solution. The salt is, naturally, inert to both DMF and water and is stable at operating temperatures. The halides, sulfates, phosphates, carbonates and nitrates are particularly suitable. Because of its availability, sodium chloride is preferred. The solution contains, desirably, between about 5 and 10 volume percent of water.

EXAMPLE I

In one series of tests, solid isophthalic acid was dissolved in liquid DMF-water solvent and in solvent saturated with sodium chloride by addition of increments of acid until the solvent was saturated. Another series of tests was run with terephthalic acid. In all tests, the solvent temperature was about 30° C.

The results of these tests are set out in Table I.

*Table I*

| Test No. | Solvent | | | Isophthalic, g./100 ml. |
|---|---|---|---|---|
| | DMF, Vol. percent | Water, Vol. percent | NaCl, Amt. | |
| 1 | 90 | 10 | None | 19 |
| 2 | 90 | 10 | Sat. | 30 |
| 3 | 70 | 30 | None | 10.5 |
| 4 | 70 | 30 | Sat. | 14 |
| | | | | Terephthalic, g./100 ml. |
| 5 | 90 | 10 | None | 1.7 |
| 6 | 90 | 10 | Sat. | 3.5 |
| 7 | 70 | 30 | None | 0.5 |
| 8 | 70 | 30 | Sat. | 0.7 |

The "literature" solubility of isophthalic acid in liquid DMF is given as 37 g./100 ml. The above results show that 10% water cuts the solubility in two and the presence of NaCl restores most of the loss in solvent power at this amount of water. As the water increases, the solvent power is decreased to an extent such that the solvent has little practical value.

EXAMPLE II

In this example the feed to the separation consists of a mixture of phthalic acid, namely, isophthalic, 54 wt. percent; terephthalic, 43.5 wt. percent and orthophthalic, 2.5 wt. percent. The feed acids were contacted with solvent at 24° C. until the solvent was saturated. The solution was filtered away from undissolved acid. The solution containing the extracted acids was evaporated to dryness; heated at 120° C. for two hours and weighed (to determine actual weight of solvent used). The acid cake was then pulverized inside the flask and washed repeatedly with distilled water. The water was decanted and filtered through paper (some acid fines were lost) until the filtrate gave no haze with silver nitrate. All acid washed from filter papers was put back into the flask. The water was then evaporated, the sample dried and analyzed.

*Table II*

| Test No. | Solvent | | | Acids Dissolved, g./100 ml. | Acid Distribution in Solution, percent | | |
|---|---|---|---|---|---|---|---|
| | DMF, Vol. percent | Water, Vol. percent | NaCl, Amt. | | IA | TA | OA |
| 9 | 90 | 10 | Sat. | 28.9 | 90 | 7 | 3 |
| 10 | 80 | 20 | Sat. | 16.9 | 88 | 8 | 4 |

These tests show that excellent separations are obtained with very good capacity even when the solvent contains 10% of water, when the DMF-water is saturated with sodium chloride.

I claim:

1. A separation process which comprises contacting a mixture of solid isophthalic acid and terephthalic acid, having a mole ratio of isophthalic acid to terephthalic acid less than about 8, with liquid dimethylformamide-water-salt solvent in an amount not more than that sufficient to theoretically dissolve all of the isophthalic acid in said mixture, separating undissolved acids from a solution of acids in solvent, and recovering acids from said solution which recovered acids are a mixture containing isophthalic acid and terephthalic acid in a mole ratio of at least about 8, wherein said solvent consists of about 10 volume percent of water, about 90 volume percent of dimethylformamide and substantially a saturation amount of sodium chloride.

2. The process of claim 1 wherein said contacting is at a temperature of about 100° C., said solution being cooled to between about 10° C. and 30° C. to crystallize out acids from the solution.

3. The process of claim 2 wherein said cooled solution, containing dissolved acids, is recycled to the contacting step.

4. The process of claim 1 wherein the liquid solvent is about that needed to theoretically dissolve all of the terephthalic acid in said mixture.

References Cited in the file of this patent

UNITED STATES PATENTS 2,794,831    McKinnis _____ June 4, 1957

OTHER REFERENCES

Weissberger: Technique of Organic Chemistry, vol. III, pp. 407–8 (1950).